(12) United States Patent
Oh et al.

(10) Patent No.: US 11,671,597 B2
(45) Date of Patent: *Jun. 6, 2023

(54) APPARATUS OF DECODING VIDEO DATA

(71) Applicant: GENSQUARE LLC, Seoul (KR)

(72) Inventors: Soo Mi Oh, Seongnam-si (KR);
Moonock Yang, Singapore (SG)

(73) Assignee: GENSQUARE LLC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,901

(22) Filed: Feb. 4, 2021

(65) Prior Publication Data

US 2021/0168367 A1    Jun. 3, 2021

Related U.S. Application Data

(63) Continuation of application No. 16/557,671, filed on Aug. 30, 2019, now Pat. No. 10,939,109, which is a
(Continued)

(30) Foreign Application Priority Data

Nov. 4, 2011 (KR) .................. 10-2011-0114610

(51) Int. Cl.
*H04N 19/119* (2014.01)
*H04N 19/593* (2014.01)
(Continued)

(52) U.S. Cl.
CPC ........... *H04N 19/124* (2014.11); *H04N 19/11* (2014.11); *H04N 19/117* (2014.11);
(Continued)

(58) Field of Classification Search
CPC .... H04N 19/11; H04N 19/119; H04N 19/124; H04N 19/129; H04N 19/157;
(Continued)

(56) References Cited

U.S. PATENT DOCUMENTS 8,942,284 B2    1/2015 Oh et al.
9,225,990 B2   12/2015 Lee et al.
(Continued)

FOREIGN PATENT DOCUMENTS

CN    101605255 A    12/2009
CN    101677406 A     3/2010
(Continued)

OTHER PUBLICATIONS

Auyeung et al., "Intra Coding with Directional DCT and Directional DWT," Joint Collaborative Team on Video Coding (JCT-VC) of ITU-T SG16 WP3 and ISO/IEC JTC1/SC29/WG11, 2nd Meeting, Geneva, CH, Jul. 21-28, 2010, Document: JCTVC-B107, pp. 1-28.
(Continued)

*Primary Examiner* — Tsion B Owens
(74) *Attorney, Agent, or Firm* — Birch, Stewart, Kolasch & Birch, LLP

(57) ABSTRACT

A method can include decoding residual signals to generate quantized coefficient components; determining an inverse scan pattern and generating a quantized block using the inverse scan pattern; deriving a quantization parameter and inversely quantizing the quantized block using the quantization parameter to generate a transformed block; and inversely transforming the transformed block to generate a residual block, in which when the quantization parameter is a chroma quantization parameter, the chroma quantization parameter is generated using a luma quantization parameter and an offset parameter indicating a relationship between the luma quantization parameter and the chroma quantization parameter, the luma quantization parameter is derived using a differential quantization parameter and a quantization parameter predictor, and the differential quantization parameter is generated by entropy decoding, and parameters are set according to certain conditions.

10 Claims, 5 Drawing Sheets

Related U.S. Application Data continuation of application No. 16/022,045, filed on Jun. 28, 2018, now Pat. No. 10,404,983, which is a continuation of application No. 15/790,853, filed on Oct. 23, 2017, now Pat. No. 10,045,027, which is a continuation of application No. 15/156,017, filed on May 16, 2016, now Pat. No. 9,813,712, which is a continuation of application No. 14/349,992, filed as application No. PCT/CN2012/083997 on Nov. 2, 2012, now Pat. No. 9,374,582.

(51) Int. Cl.

| | |
|---|---|
| H04N 19/124 | (2014.01) |
| H04N 19/176 | (2014.01) |
| H04N 19/122 | (2014.01) |
| H04N 19/11 | (2014.01) |
| H04N 19/117 | (2014.01) |
| H04N 19/463 | (2014.01) |
| H04N 19/159 | (2014.01) |
| H04N 19/129 | (2014.01) |
| H04N 19/186 | (2014.01) |
| H04N 19/157 | (2014.01) |
| H04N 19/82 | (2014.01) |
| H04N 19/13 | (2014.01) |
| H04N 19/172 | (2014.01) |

(52) U.S. Cl.
CPC ......... *H04N 19/122* (2014.11); *H04N 19/129* (2014.11); *H04N 19/13* (2014.11); *H04N 19/157* (2014.11); *H04N 19/159* (2014.11); *H04N 19/172* (2014.11); *H04N 19/176* (2014.11); *H04N 19/186* (2014.11); *H04N 19/463* (2014.11); *H04N 19/593* (2014.11); *H04N 19/82* (2014.11); *H04N 19/119* (2014.11)

(58) Field of Classification Search
CPC ........... H04N 19/593; H04N 19/00896; H04N 19/00072; H04N 19/176
See application file for complete search history.

(56) References Cited

U.S. PATENT DOCUMENTS

| | | | | |
|---|---|---|---|---|
| 9,294,769 | B2* | 3/2016 | Jeon | ........................ H04N 19/61 |
| 9,294,775 | B2 | 3/2016 | Lee et al. | |
| 2006/0177143 | A1 | 8/2006 | Winger | |
| 2009/0175334 | A1 | 7/2009 | Ye et al. | |
| 2009/0190829 | A1 | 7/2009 | Suzuki et al. | |
| 2009/0195690 | A1 | 8/2009 | Wang | |
| 2012/0230403 | A1 | 9/2012 | Liu et al. | |
| 2012/0314766 | A1 | 12/2012 | Chien et al. | |
| 2013/0051457 | A1 | 2/2013 | Joshi et al. | |
| 2013/0089144 | A1 | 4/2013 | Lee | |
| 2013/0136375 | A1* | 5/2013 | Sasai | ..................... H04N 19/184 |
| | | | | 382/238 |
| 2013/0266064 | A1 | 10/2013 | Zhang et al. | |
| 2014/0098867 | A1 | 4/2014 | Park | |
| 2014/0219336 | A1* | 8/2014 | Jeon | ..................... H04N 19/182 |
| | | | | 375/240.02 |
| 2014/0314142 | A1* | 10/2014 | Oh | ........................ H04N 19/176 |
| | | | | 375/240.02 |
| 2014/0328397 | A1* | 11/2014 | Jeon | ..................... H04N 19/117 |
| | | | | 375/240.12 |
| 2015/0124876 | A1* | 5/2015 | Lee | ....................... H04N 19/176 |
| | | | | 375/240.12 |
| 2015/0208066 | A1 | 7/2015 | Seregin et al. | |
| 2015/0222897 | A1 | 8/2015 | Park | |

FOREIGN PATENT DOCUMENTS

| | | |
|---|---|---|
| JP | 2014-528670 A | 10/2014 |
| WO | WO 2011/019383 | 2/2011 |
| WO | WO 2011/031332 A1 | 3/2011 |
| WO | WO 2011/043797 A2 | 4/2011 |
| WO | WO 2011/081637 A1 | 7/2011 |
| WO | WO 2011/126349 A2 | 10/2011 |
| WO | WO 2012/170812 A1 | 12/2012 |
| WO | WO 2013/002556 A2 | 1/2013 |
| WO | WO 2013/037489 A1 | 3/2013 |
| WO | WO 2013/039676 A1 | 3/2013 |
| WO | WO 2013/051903 A1 | 4/2013 |
| WO | WO 2013/062193 A1 | 5/2013 |
| WO | WO 2013/062195 A1 | 5/2013 |

OTHER PUBLICATIONS

Bross et al., "High efficiency video coding (HEVC text specification draft 7," Joint Collaborative Team on Video Coding (JCT-VC) of ITU-T SG16 WP3 and ISO/IEC JTC1/SC29/WG11, JCTVC-I1003_d9 (Version 10), 9th Meeting: Geneva, CH, Apr. 27, 2012-May 7, 2012 (Jul. 14, 2012), 280 pages.

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, Document: JCTVC-F803 d6, 6th Meeting, Torino, Italy, Jul. 14-22, 2011, 229 pages.

Chen et al., "CE6.a: Chroma Intra Prediction by Reconstructed Luma Samples," Joint Collaborative Team on Video Coding (JCT-VC) of ITU-T SG16 WP3 and ISO/IEC JTC1/SC29/WG11, Document: JCTVC-D350, 4th Meeting: Daegu, KR, Jan. 20-28, 2011, pp. 1-7, XP030008389.

Chen, "BoG Report on Intra Mode Coding with Fixed Number of MPM Candidates," Joint Collaborative Team on Video Coding (JCT-VC) of ITU-T SG16 WP3 and ISO/IEC JTC1/SC29/WG11, Document: JCTVC-F765, 6th Meeting: Torino, Italy, Jul. 14-22, 2011, pp. 1-3, XP-030009788.

Chien et al., "Parsing friendly intra mode coding", Joint Collaborative Team on Video Coding (JCT-VC) of ITU-T SG16 WP3 and ISO/IEC JTC1/SC29/WG11, JCTVC-F459, 6th Meeting: Torino, Italy, Jul. 14-22, 2011, pp. 1-5, XP030009482.

Chien et al., "Parsing Friendly Intra Mode Coding", Joint Collaborative Team on Video Coding (JCT-VC) of ITU-T SG16 WP3 and ISO/IEC JTC1/SC29/WG11, JCTVC-F459r2, 6th Meeting, Torino, Italy, Jul. 14-22, 2011, pp. 1-5.

Chuang et al., "Luma Intra Prediction Mode Coding", Joint Collaborative Team on Video Coding (JCT-VC) of ITU-T SG16 WP3 and ISO/IEC JTC1/SC29/WG11, JCTVC-F062, 6th Meeting: Torino, Italy, Jul. 14-22, 2011, pp. 1-5, XP030009085.

Chuang et al., "CE6b: Intra Prediction Mode Coding," Joint Collaborative Team on Video Coding (JCT-VC) of ITU-T SG16 WP3 and ISO/IEC JTC1/SC29/WG11, Document: JCTVC-G203, 7th Meeting: Geneva, CH, Nov. 21-30, 2011, pp. 1-6, XP030050324.

Dai, et al., "Improved Signaling and Binarization of Chroma Intra Prediction Mode," Joint Collaborative Team on Video Coding (JCT-VC) of ITU-T SG16 WP3 and ISO/IEC JTC1/SC29/WG11, Document: JCTVC-D278_r2, 4th Meeting: Daegu, KR, Jan. 20-28, 2011, pp. 1-5.

Dong et al., "Improved Chroma Intra Mode Signaling," Joint Collaborative Team on Video Coding (JCT-VC) of ITU-T SG16 WP3 and ISO/IEC JTC1/SC29/WG11, Document: JCTVC-D255, 4th Meeting: Daegu, KR, Jan. 20-28, 2011, pp. 1-4.

International Search Report for PCT/CN2012/083997 dated Nov. 2, 2012.

Kumakura et al., "Fixing the No. of MPM Candidates," Joint Collaborative Team on Video Coding (JCT-VC) of ITU-T SG16 WP3 and ISO/IEC JTC1/SC29/WG11, Document: JCTVC-F340, 6th Meeting: Torino, IT, Jul. 14-22, 2011, pp. 1-8, XP030009363.

Kumakura et al., "Intra Prediction Mode Coding Based on Direction Difference," Joint Collaborative Team on Video Coding (JCT-VC) of ITU-T SG16 WP3 and ISO/IEC JTC1/SC29/WG11, Document: JCTVC-F339, 6th Meeting: Torino, IT, Jul. 14-22, 2011, pp. 1-13.

(56) References Cited

OTHER PUBLICATIONS

Sato, "CE4: Result of Combination 2.3.g + 2.3.e," JCTVC-F648, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-4.
Wiegand et al., "WD2: Working Draft 2 of High-Efficiency Video Coding," Joint Collaborative Team on Video Coding (JCT-VC) of ITU-T SG16 WP3 and ISO/IEC JTC1/SC29/WG11, Document: JCTVC-D503, 4th Meeting: Daegu, KR, Jan. 20-28, 2011, 12 pages.
Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, Document: JCTVC-E603, 5th Meeting: Geneva, CH, Mar. 16-23, 2011, 217 pages, XP030009014.
Yi-Hsin Huang et al., "Fast Decision of Block Size, Prediction Mode, and Intra Block for H.264 Intra Prediction", IEEE Transaction On Circuitsand Systems for Video Technology, Aug. 2010, pp. 1122-1132, vol. 20, No. 8.
Zhang et al., "Method for deriving Chroma QP from Luma QP," JCTVC-F277, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-6.

\* cited by examiner

APPARATUS OF DECODING VIDEO DATA

CROSS-REFERENCE TO RELATED APPLICATIONS

This Application is a Continuation of U.S. patent application Ser. No. 16/557,671 filed on Aug. 30, 2019 (U.S. Pat. No. 10,939,109 issued on Mar. 2, 2021), which is a Continuation U.S. patent application Ser. No. 16/022,045 filed on Jun. 28, 2018 (U.S. Pat. No. 10,404,983 issued on Sep. 3, 2019), which is a Continuation of U.S. patent application Ser. No. 15/790,853 filed on Oct. 23, 2017 (U.S. Pat. No. 10,045,027 issued on Aug. 7, 2018), which is a Continuation of U.S. patent application Ser. No. 15/156,017 filed on May 16, 2016 (U.S. Pat. No. 9,813,712 issued on Nov. 7, 2017), which is a Continuation of U.S. patent application Ser. No. 14/349,992 filed on Apr. 4, 2014 (U.S. Pat. No. 9,374,582 issued on Jun. 21, 2016), which is filed as the National Phase of PCT/CN2012/083997 filed on Nov. 2, 2012, which claims the benefit under 35 U.S.C. § 119(a) to Korean Patent Application No. 10-2011-0114610 filed on Nov. 4, 2011, all of these applications are hereby expressly incorporated by reference into the present application.

BACKGROUND OF THE INVENTION

Field of the Invention

The present invention relates an apparatus of decoding video data, and more particularly, to an apparatus of deriving intra prediction mode, generating a prediction block and a residual block to recover a reconstructed block for luma and chroma components.

Discussion of the Related Art

In H.264/MPEG-4 AVC, one picture is divided into macroblocks to encode an image, the respective macroblocks are encoded by generating a prediction block using inter prediction or intra prediction. The difference between an original block and the prediction block is transformed to generate a transformed block, and the transformed block is quantized using a quantization parameter and one of a plurality of predetermined quantization matrices. The quantized coefficient of the quantized block are scanned by a predetermined scan type and then entropy-coded. The quantization parameter is adjusted per macroblock and encoded using a previous quantization parameter.

Meanwhile, techniques using various size of coding unit are introduced to improve the coding efficacy. Techniques increasing a number of luma and chroma intra prediction modes are also introduces to generate a prediction block more similar to an original block.

But, the amount of coding bits required for signaling the intra prediction mode increases as the number of intra prediction modes increases. Also, the difference between an original block and a prediction block prediction block is greater as the size of the coding unit is larger. Accordingly, more effective method is required to encode and decode video data for luma and chroma components.

SUMMARY OF THE INVENTION

The present invention is directed to an apparatus of deriving an intra prediction mode, generating referential pixels, adaptively filtering reference pixels and generating a prediction block.

One aspect of the present invention provides an apparatus of decoding video data, comprising a prediction mode decoding unit configured to derive a luma intra prediction mode and a chroma intra prediction mode; a prediction size determining unit configured to determine a size of a luma transform unit and a size of a chroma transform unit using luma transform size information; a reference pixel generating unit configured to generate referential pixels if at least one reference pixel is unavailable; a reference pixel filtering unit configured to adaptively filter the reference pixels of a current luma block based on the luma intra prediction mode and the size of the luma transform unit, and not to filter the reference pixels of a current chroma block; a prediction block generating unit configured to generate prediction blocks of the current luma block and the current chroma block; and a residual bock generating unit configured to generate a residual luma residual block and a chroma residual block.

An apparatus according to an aspect of the present invention derives a luma intra prediction mode and a chroma intra prediction mode, determines a size of a luma transform unit and a size of a chroma transform unit using luma transform size information, adaptively filters the reference pixels of a current luma block based on the luma intra prediction mode and the size of the luma transform unit, generates prediction blocks of the current luma block and the current chroma block and generates a residual luma residual block and a chroma residual block. Therefore, the distance of intra prediction becomes short, and the amount of coding bits required to encode intra prediction modes and residual blocks of luma and chroma components is reduced and the coding complexity is reduced by adaptively encoding the intra prediction modes and adaptively filtering the reference pixels.

According to another aspect of the present invention, an apparatus for generating a residual block includes an entropy decoding unit configured to decode residual signals to generate quantized coefficient components; an inverse scanning unit configured to determine an inverse scan pattern and generate a quantized block using the inverse scan pattern; an inverse quantization unit configured to derive a quantization parameter and inversely quantize the quantized block using the quantization parameter to generate a transformed block; and an inverse transform unit configured to inversely transform the transformed block to generate a residual block, wherein when the quantization parameter is a chroma quantization parameter, the chroma quantization parameter is generated using a luma quantization parameter and an offset parameter indicating a relationship between the luma quantization parameter and the chroma quantization parameter, the luma quantization parameter is derived using a differential quantization parameter and a quantization parameter predictor, the differential quantization parameter is generated by entropy decoding, if two or more quantization parameters are available among a left quantization parameter, an above quantization parameter and a previous quantization parameter of a current coding unit, the quantization parameter predictor is generated using two available quantization parameters determined according a predetermined order, and if only one quantization parameter is available, the available quantization parameter is set as the quantization parameter predictor.

DETAILED DESCRIPTION OF THE EMBODIMENTS

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

Figure 1:
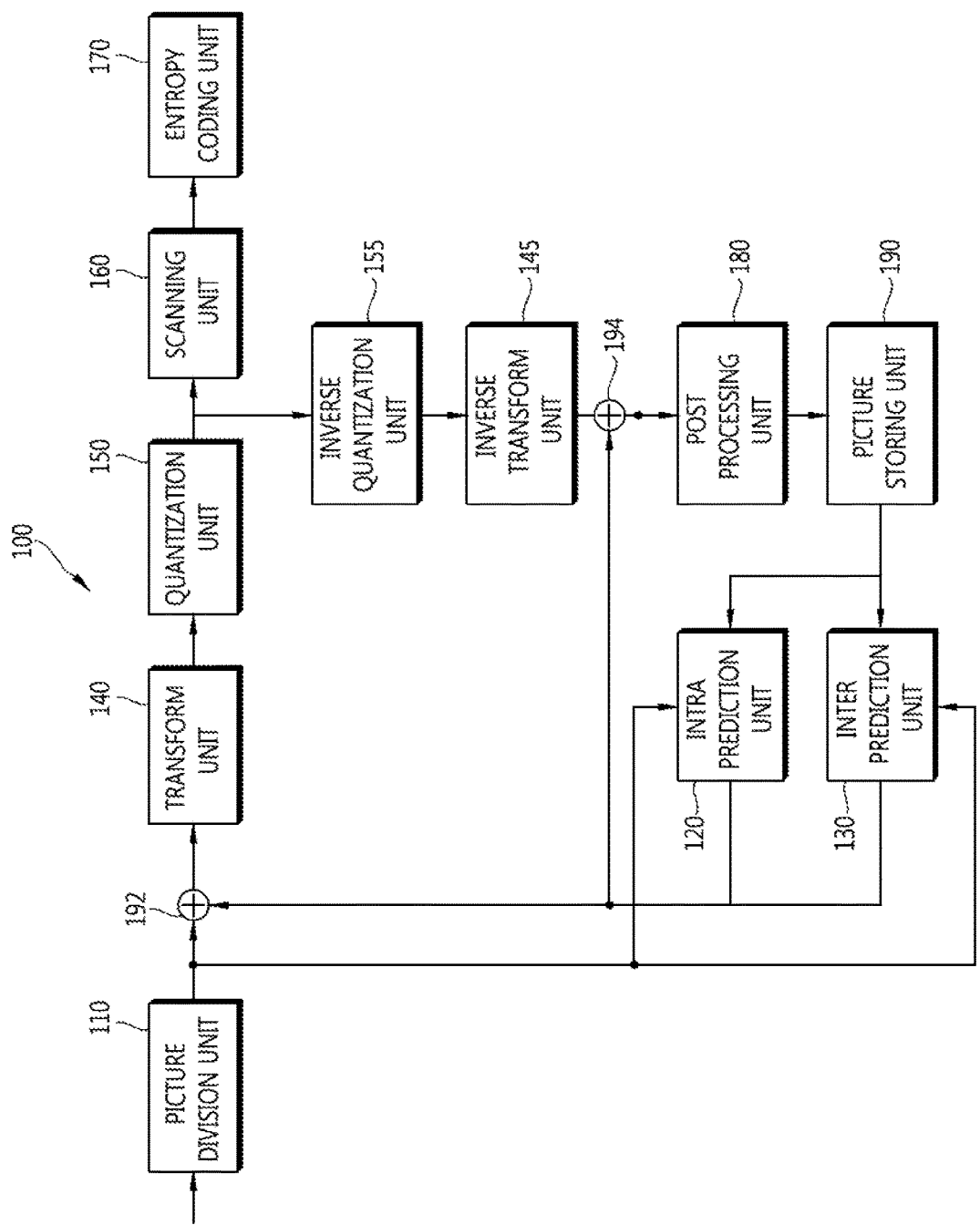
FIG. 1 is a block diagram of an image coding apparatus according to an embodiment of the present invention.

FIG. 1 is a block diagram of an image coding apparatus 100 according to the present invention.

Referring to FIG. 1, the image coding apparatus 100 according to the present invention includes a picture division unit 110, an intra prediction unit 120, an inter prediction unit 130, a transform unit 140, a quantization unit 150, a scanning unit 160, an entropy coding unit 170, an inverse quantization unit 155, an inverse transform unit 145, a post-processing unit 180, a picture storing unit 190, a subtracter 192 and an adder 194.

The picture division unit 110 divides a picture into slices, divides a slice into largest coding units (LCUs), and divides each LCU into one or more coding units. The picture division unit 110 determines prediction mode of each coding unit and a size of prediction unit. The picture, slice and coding unit are comprised of luminance sample array (luma array) and two chrominance sample arrays (chroma arrays). A chroma block has half the height and half the width of a luma block. The block may be a LCU, coding unit or a prediction unit. Hereafter, a luma coding unit, a luma prediction unit and a luma transform unit are referred to as a coding unit, a prediction unit and a transform unit respectively.

An LCU includes one or more coding units. The LCU has a recursive quad tree structure to specify a division structure of coding units. Parameters for specifying the maximum size and the minimum size of the coding unit are included in a sequence parameter set. The division structure is specified by one or more split coding unit flags (split_cu_flags). The size of a coding unit is 2N×2N.

A coding unit includes one or more prediction units. In intra prediction, the size of the prediction unit is 2N×2N or N×N. In inter prediction, the size of the prediction unit is 2N×2N, 2N×N, N×2N or N×N.

A coding unit includes one or more transform units. The transform unit has a recursive quad tree structure to specify a division structure. The division structure is specified by one or more split transform unit flags (split_tu_flags). Parameter for specifying the maximum size and the minimum size of the luma transform unit is included in a sequence parameter set. The chroma transform unit has half the height and half the width of the transform unit if the transform unit is not 4×4. The minimum size of the chroma transform unit is 4×4.

The intra prediction unit 120 determines an intra prediction mode of a current prediction unit and generates a prediction block using the intra prediction mode. A size of the prediction block is equal to a size of the transform unit.

The inter prediction unit 130 determines motion information of the current prediction unit using one or more reference pictures stored in the picture storing unit 190, and generates a prediction block of the prediction unit. The motion information includes one or more reference picture indexes and one or more motion vectors.

The transform unit 140 transforms residual signals generated using an original block and a prediction block to generate a transformed block. The residual signals are transformed by the transform unit. A transform type is determined by the prediction mode and the size of the transform unit. The transform type is a DCT-based integer transform or a DST-based integer transform. In inter prediction, DCT-based integer transforms are used. In intra prediction mode, if the size of the transform unit is smaller than a predetermined size, the DST-based integer transforms are used, otherwise the DCT-based integer transforms are used. The predetermined size is 8×8. The transform type of the chroma transform unit is equal to the transform type of the corresponding transform unit. Therefore, the transform type for the chroma transform unit is the DCT-based integer transform.

The quantization unit 150 determines a quantization parameter for quantizing the transformed block. The quantization parameter is a quantization step size. The luma quantization parameter is referred to as the quantization parameter. The quantization parameter is determined per quantization unit. The size of the quantization unit is one of allowable sizes of coding unit. If a size of the coding unit is equal to or larger than the minimum size of the quantization unit, the coding unit becomes the quantization unit. A plurality of coding units may be included in a quantization unit. The minimum size of the quantization unit is determined per picture and a parameter for specifying the minimum size of the quantization unit is included in a picture parameter set. A chroma quantization parameter is determined by the quantization parameter. The relationship between the quantization parameter and the chroma quantization parameter may be determined by the picture. A parameter for indicating the relationship is transmitted in a picture parameter set (PPS). The relationship may be changed by the slice. Another parameter for changing the relationship may be transmitted in a slice header.

The quantization unit 150 generates a quantization parameter predictor and generates a differential quantization parameter by subtracting the quantization parameter predictor from the quantization parameter. The differential quantization parameter is entropy-coded.

The quantization parameter predictor is generated by using quantization parameters of neighboring coding units and quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameter are available, the average of the left and above quantization parameter is set as the quantization parameter predictor. If only one of the left and above quantization parameter is available, the average of the available quantization parameter and the previous quantization parameter is set as the quantization parameter predictor. If both of the left and above quantization parameter are unavailable, the previous quantization parameter is set as the quantization parameter predictor. The average is rounded off.

The quantization unit 150 quantizes the transformed block using a quantization matrix and the quantization parameter to generate a quantized block. The quantized block is provided to the inverse quantization unit 155 and the scanning unit 160.

The scanning unit 160 determines a scan pattern and applies the scan pattern to the quantized block. When CABAC is used for entropy coding, the scan pattern is determined as follows.

In intra prediction, the scan pattern is determined by the intra prediction mode and the size of the transform unit. The size of the transform unit, the size of transformed block and the size of the quantized block are same. The scan pattern is selected among a diagonal scan, vertical scan and horizontal scan. The quantized transform coefficients of the quantized block are split into significant flags, coefficient signs and coefficient levels. The scan pattern is applied to the significant flags, coefficient signs and coefficient levels respectively. The significant flag indicates whether the corresponding quantized transform coefficient is zero or not. The coefficient sign indicates a sign of non-zero quantized transform coefficient, and the coefficients level indicates an absolute value of non-zero quantized transform coefficient.

When the size of the transform unit is equal to or smaller than a first size, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. When the size of the transform unit is larger than the first size, the diagonal scan is used. The first size is 8×8. The predetermined number is 8 if the transform unit is 8×8.

In inter prediction, a predetermined scan pattern is used regardless of the size of the transform unit. The predetermined scan pattern is the diagonal scan.

The scan pattern of a chroma transform unit is equal to the scan pattern of a corresponding luma transform unit. Therefore, the scan pattern is selected among the diagonal scan, the vertical scan and the horizontal scan as shown above when the size of the chroma transform unit is 4×4, and the diagonal scan is used when the size of the chroma transform unit is larger than 4×4.

When the size of the transform unit is larger than a second size, the quantized block is divided into a main subset and a plurality of remaining subsets and the determined scan pattern is applied to each subset. Significant flags, coefficient signs and coefficients levels of each subset are scanned respectively according to the determined scan pattern. The main subset includes DC coefficient and the remaining subsets covers the region other than the region covered by the main subset. The second size is 4×4. The subset is a 4×4 block containing 16 transform coefficients. The subset for chroma is also a 4×4 block containing 16 transform coefficients.

The scan pattern for scanning the subsets is the same as the scan pattern for scanning quantized transform coefficients of each subset. The quantized transform coefficients of each subset are scanned in the reverse direction. The subsets are also scanned in the reverse direction.

Last non-zero coefficient position is encoded and transmitted to the decoder. The last non-zero coefficient position specifies a position of last non-zero quantized transform coefficient within the transform unit. The last non-zero coefficient position is used to determine the number of subsets to be signaled in the decoder. Non-zero subset flag is set for the subsets other than the main subset and the last subset. The last subset covers the last non-zero coefficient. The non-zero subset flag indicates whether the subset contains non-zero coefficients or not.

The inverse quantization unit 155 inversely quantizes the quantized transform coefficients of the quantized block.

The inverse transform unit 145 inversely transforms the inverse quantized block to generate residual signals of the spatial domain.

The adder 194 generates a reconstructed block by adding the residual block and the prediction block.

The post-processing unit 180 performs a deblocking filtering process for removing blocking artifact generated in a reconstructed picture.

The picture storing unit 190 receives post-processed image from the post-processing unit 180, and stores the image in picture units. A picture may be a frame or a field.

The entropy coding unit 170 entropy-codes the one-dimensional coefficient information received from the scanning unit 160, intra prediction information received from the intra prediction unit 120, motion information received from the inter prediction unit 130, and so on.

Figure 2:
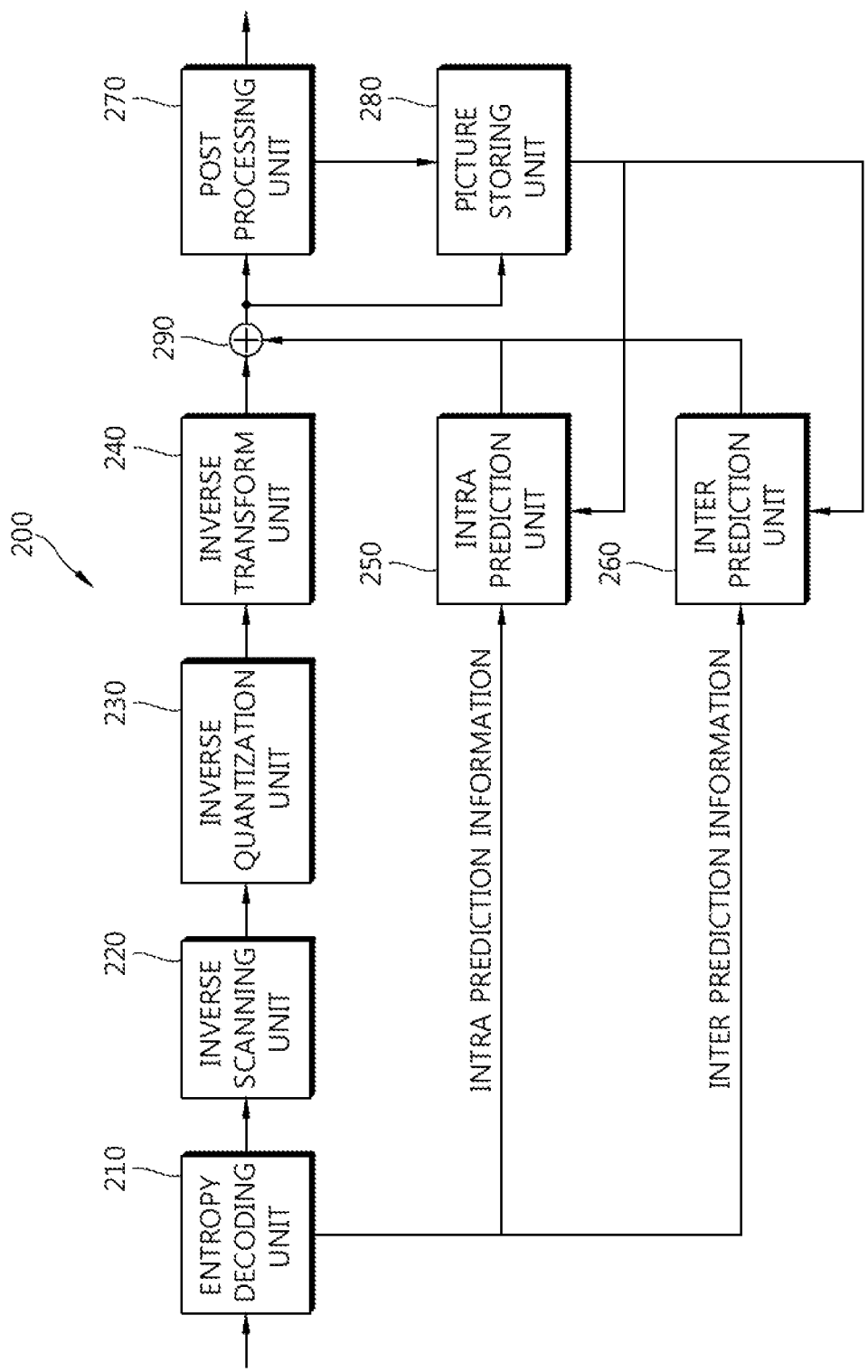
FIG. 2 is a block diagram of an image decoding apparatus according to an embodiment of the present invention.

FIG. 2 is a block diagram of an image decoding apparatus 200 according to the present invention.

The image decoding apparatus 200 according to the present invention includes an entropy decoding unit 210, an inverse scanning unit 220, an inverse quantization unit 230, an inverse transform unit 240, an intra prediction unit 250, an inter prediction unit 260, a post-processing unit 270, a picture storing unit 280 and an adder 290.

The entropy decoding unit 210 extracts the intra prediction information, the inter prediction information and the one-dimensional coefficient information from a received bit stream. The entropy decoding unit 210 transmits the inter prediction information to the inter prediction unit 260, the intra prediction information to the intra prediction unit 250 and the coefficient information to the inverse scanning unit 220.

The inverse scanning unit 220 uses an inverse scan pattern to generate a quantized block. When CABAC is used for entropy coding, the scan pattern is determined as follows.

In intra prediction, the inverse scan pattern is determined by the intra prediction mode and the size of the transform unit. The inverse scan pattern is selected among a diagonal scan, vertical scan and horizontal scan. The selected inverse scan pattern is applied to significant flags, coefficient signs and coefficients levels respectively to generate the quantized block. The inverse scan pattern of the chroma transform unit is equal to the scan pattern of a corresponding luma transform unit. The minimum size of the chroma transform unit is 4×4.

When the size of the transform unit is equal to or smaller than a first size, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. When the size of the transform unit is larger than the first size, the diagonal scan is used. When the size of the transform unit is larger than the first size, the diagonal scan is selected for all intra prediction modes. The first size is 8×8. The predetermined number is 8 if the transform unit is 8×8.

In inter prediction, the diagonal scan is used.

When the size of the transform unit is larger than the second size, the significant flags, the coefficient signs and the coefficients levels are inversely scanned in the unit of subset using the determined inverse scan pattern to generate subsets, and the subsets are inversely scanned to generate the quantized block. The second size is equal to the size of the subset. The subset is a 4×4 block including 16 transform coefficients. The subset for chroma is also a 4×4 block. Therefore, when the size of the chroma transform unit is larger than the second size, the subsets are generated first and the subsets are inversely scanned.

The inverse scan pattern used for generating each subset is the same as the inverse scan pattern used for generating the quantized block. The significant flags, the coefficient signs and the coefficient levels are inversely scanned in the reverse direction. The subsets are also inversely scanned in the reverse direction.

The last non-zero coefficient position and the non-zero subset flags are received from the encoder. The number of encoded subsets is determined according to the last non-zero coefficient position and the inverse scan pattern. The non-zero subset flags are used to select subsets to be generated. The main subset and the last subset are generated using the inverse scan pattern.

The inverse quantization unit 230 receives the differential quantization parameter from the entropy decoding unit 210 and generates the quantization parameter predictor to generate the quantization parameter of the coding unit. The operation of generating the quantization parameter is the same as the operation of the quantization unit 150 of FIG. 1. Then, the quantization parameter of the current coding unit is generated by adding the differential quantization parameter and the quantization parameter predictor. If the differential quantization parameter for the current coding unit is not received from the encoder, the differential quantization parameter is set to 0.

A parameter for indicating the relationship between the quantization parameter and the chroma quantization parameter is included in the PPS. Another parameter is included in the slice header if it is allowed to change the relationship by the slice. Therefore, the chroma quantization parameter is generated using the quantization parameter and the parameter included in the PPS or using the quantization parameter and the two parameters.

The inverse quantization unit 230 inversely quantizes the quantized block.

The inverse transform unit 240 inversely transforms the inverse-quantized block to restore a residual block. The inverse transform type is adaptively determined according to the prediction mode and the size of the transform unit. The inverse transform type is the DCT-based integer transform or the DST-based integer transform. For example, in inter prediction, DCT-based integer transforms are used. In intra prediction mode, if the size of the transform unit is smaller than a predetermined size, the DST-based integer transforms are used, otherwise the DCT-based integer transforms are used. The inverse transform type of the chroma transform unit is equal to the inverse transform type of the corresponding transform unit. Therefore, the inverse transform type for the chroma transform unit is the DCT-based integer transform.

The intra prediction unit 250 restores the intra prediction mode of the current prediction unit using the received intra prediction information, and generates a prediction block according to the restored intra prediction mode.

The inter prediction unit 260 restores the motion information of the current prediction unit using the received inter prediction information, and generates a prediction block using the motion information.

The post-processing unit 270 operates the same as the post-processing unit 180 of FIG. 1.

The picture storing unit 280 receives post-processed image from the post-processing unit 270, and stores the image in picture units. A picture may be a frame or a field.

The adder 290 adds the restored residual block and a prediction block to generate a reconstructed block.

Figure 3:
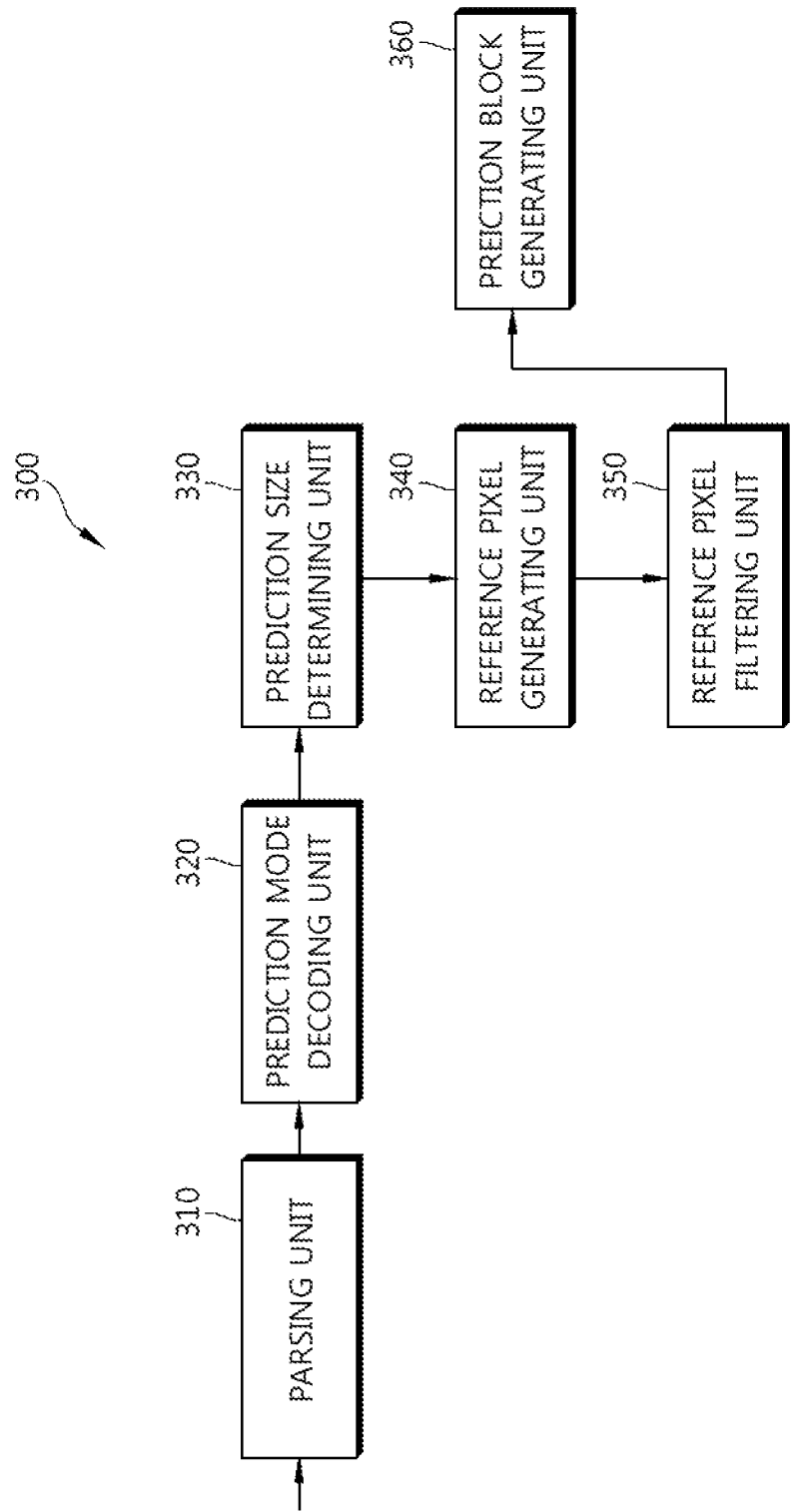
FIG. 3 is a block diagram of an apparatus of generating a prediction block according to an embodiment of the present invention.

FIG. 3 is a block diagram of an apparatus 300 of generating a prediction block according to the present invention.

The apparatus 300 according to the present invention includes a parsing unit 310, a prediction mode decoding unit 320, a prediction size determining unit 330, a reference pixel generating unit 340, a reference pixel filtering unit 350 and a prediction block generating unit 360.

The parsing unit 310 parses intra prediction parameters of the current prediction unit from the bit stream.

The intra prediction parameters for luma includes are a mode group indicator and a prediction mode index. The mode group indicator is a flag indicating whether the intra prediction mode of the current prediction unit belongs to a most probable mode group (MPM group). If the flag is 1, the intra prediction unit of the current prediction unit belongs to the MPM group. If the flag is 0, the intra prediction unit of the current prediction unit belongs to a residual mode group. The residual mode group includes all intra prediction modes other than the intra prediction modes of the MPM group. The prediction mode index specifies the intra prediction mode of the current prediction unit within the group specified by the mode group indicator. The intra prediction parameter for chroma is specified by a chroma prediction mode index.

The prediction mode decoding unit 320 derives a luma intra prediction mode and a chroma intra prediction mode.

The luma intra prediction mode is derived as follows.

The MPM group is constructed using intra prediction modes of the neighboring prediction units. The intra prediction modes of the MPM group are adaptively determined by a left intra prediction mode and an above intra prediction mode. The left intra prediction mode is the intra prediction mode of the left neighboring prediction unit, and the above intra prediction mode is the intra prediction mode of the above neighboring prediction unit. The MPM group is comprised of three intra prediction modes.

If the left or above neighboring prediction unit does not exist, the intra prediction mode of the left or above neighboring unit is set as unavailable. For example, if the current prediction unit is located at the left or upper boundary of a picture, the left or above neighboring prediction unit does not exist. If the left or above neighboring unit is located within other slice, the intra prediction mode of the left or above neighboring unit is set as unavailable.

Figure 4:
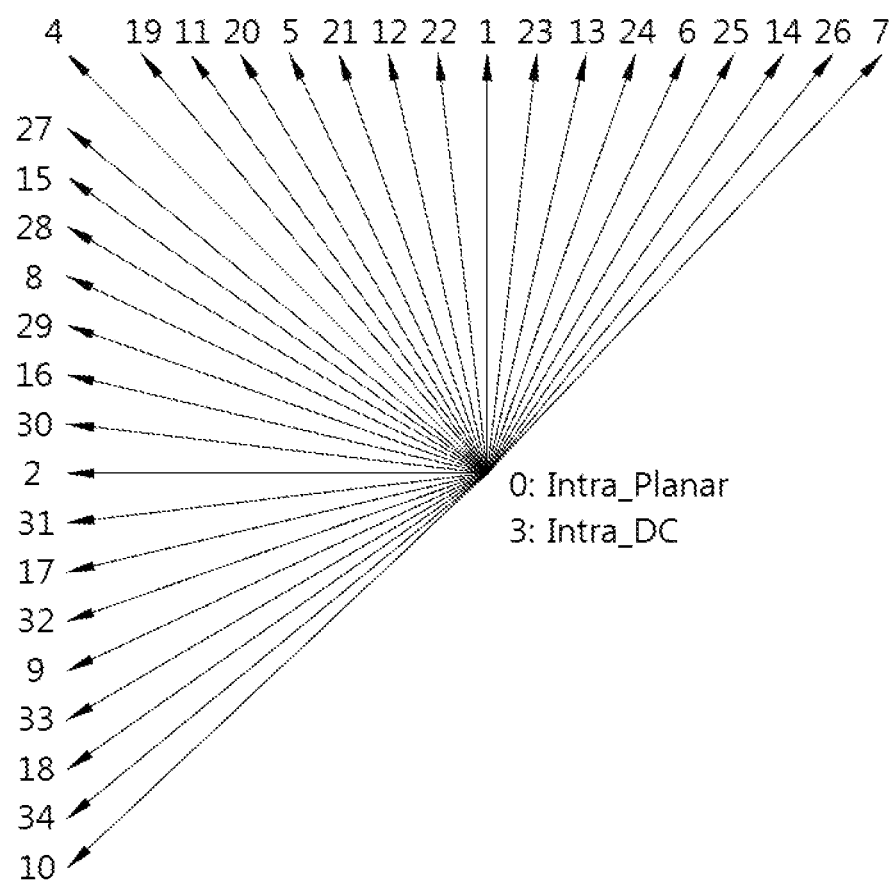
FIG. 4 is a conceptual diagram illustrating intra prediction modes according to an embodiment of the present invention.

FIG. 4 is a conceptual diagram illustrating intra prediction modes according to the present invention. As shown in FIG. 4, the number of intra prediction modes is 35. The DC mode and the planar mode are non-directional intra prediction modes and the others are directional intra prediction modes.

When both of the left intra prediction mode and the above intra prediction mode are available and are different each other, the left intra prediction mode and the above intra prediction mode are included in the MPM group and one additional intra prediction mode is added to the MPM group. If one of the left and above intra prediction modes is a non-directional mode and the other is a directional mode, the other non-directional mode is set as the additional intra prediction mode. If both of the left and above intra prediction modes are non-directional modes, the vertical mode is set as the additional intra prediction mode.

When only one of the left intra prediction mode and the above intra prediction mode is available, the available intra prediction mode is included in the MPM group and two additional intra prediction modes are added to the MPM group. If the available intra prediction mode is a non-directional mode, the other non-directional mode and the vertical mode are set as the additional intra prediction modes. If the available intra prediction mode is a directional mode, two non-directional modes are set as the additional intra prediction modes.

When both of the left intra prediction mode and the above intra prediction mode are unavailable, the DC mode, the planar mode and the vertical mode are added to the MPM group.

If the mode group indicator indicates the MPM group, the intra prediction of the MPM group specified by the prediction mode index is set as the intra prediction mode of the current prediction unit.

If the mode group indicator does not indicate the MPM group, the three intra predictions of the MPM group are reordered in the mode number order. Among the three intra prediction modes of the MPM group, the intra prediction mode with lowest mode number is set to a first candidate, the intra prediction mode with middle mode number is set to a second candidate, and the intra prediction mode with highest mode number is set to a third candidate.

If the prediction mode index is equal to or greater than the first candidate of the MPM group, the value of the prediction mode index is increased by one. If the prediction mode index is equal to or greater than the second candidate of the MPM group, the value of the prediction mode index is increased by one. If the prediction mode index is equal to or greater than the third candidate of the MPM group, the value of the prediction mode index is increased by one. The value of the final prediction mode index is set as the mode number of the intra prediction mode of the current prediction unit.

The chroma intra prediction mode is set as an intra prediction mode specified by the chroma prediction mode index. If the chroma prediction index specifies a DM mode (direct mode), the chroma intra prediction mode is set equal to the luma intra prediction mode.

The prediction size determining unit 330 determines the size of the prediction block based on the transform size information specifying the size of the transform unit. The transform size information may be one or more split_tu_flags. The size of the chroma prediction block is also determined based on the transform size information. The minimum size of the chroma prediction is 4×4.

If the size of the transform unit is equal to the size of the current prediction unit, the size of the prediction block is equal to the size of the current prediction unit.

If the size of the transform unit is smaller than the size of the current prediction unit, the size of the prediction block is equal to the size of the transform unit. In this case, a process of generating a reconstructed block is performed on each sub-block of the current prediction unit. That is, a prediction block and a residual block of a current sub-block are generated and a reconstructed block of each sub-block is generated by adding the prediction block and the residual block. Then, a prediction block, a residual block and a reconstructed block of the next sub-block in decoding order are generated. The restored intra prediction mode is used to generate all prediction blocks of all sub-block. Some pixels of the reconstructed block of the current sub-block are used as reference pixels of the next sub-block. Therefore, it is possible to generate a prediction block which is more similar to the original sub-block.

The reference pixel generating unit 340 generates reference pixels if one or more reference pixels of the current block are unavailable. The reference pixels of the current blocks are comprised of above reference pixels located at ($x=0, \ldots, 2N-1, y=-1$), left reference pixels located at ($x=1-, y=0, \ldots, 2M-1$) and a corner pixel located at ($x=-1, y=-1$). N is the width of the current block and M is the height of the current block. The current block is the current prediction unit or the current sub-block having the size of the transform unit. Reference pixels of the current chroma block are also generated if one or more reference pixels are unavailable.

If all reference pixels are unavailable, the value of $2^{L-1}$ is substituted for the values of all the reference pixels. The value of L is the number of bits used to represent luminance pixel value.

If available reference pixels are located at only one side of the unavailable reference pixel, the value of the reference pixel nearest to the unavailable pixel is substituted for the unavailable reference pixel.

If available reference pixels are located at both sides of the unavailable reference pixel, the average value of the reference pixels nearest to the unavailable pixel in each side or the value of the reference pixel nearest to the unavailable pixel in a predetermined direction is substituted for each unavailable reference pixel.

The reference pixel filtering unit 350 adaptively filters the reference pixels of the current luma block based on the intra prediction mode and the size of the transform unit.

In the DC mode, the reference pixels are not filtered. In the vertical mode and the horizontal mode, the reference pixels are not filtered. In the directional modes other than the vertical and horizontal modes, the reference pixels are adaptively according to the size of the current block.

If the size of the current is 4×4, the reference pixels are not filtered in all intra prediction modes. For the size 8×8, 16×16 and 32×32, the number of intra prediction mode where the reference pixels are filtered increases as the size of the current block becomes larger. For example, the reference pixels are not filtered in the vertical mode and a predetermined number of neighboring intra prediction mode of the vertical mode. The reference pixels are also not filtered in the horizontal mode and the predetermined number of neighboring intra prediction mode of the horizontal mode. The predetermined number lies between 0 to 7 and decreases as the size of the current block is larger.

The reference pixel filtering unit 350 does not filter the reference pixels of the current chroma block regardless of the intra prediction mode and the size of the transform unit.

The prediction block generating unit 360 generates a prediction block of the current block using the reference pixels according to the restored intra prediction mode.

In the DC mode, the prediction pixels of the prediction block are generated by averaging the N reference pixels located at ($x=0, \ldots N-1, y=-1$) and the M reference pixels located at ($x=-1, y=0, \ldots M-1$). The luma prediction pixels adjacent to the reference pixel are filtered by the one or two adjacent reference pixels. The chroma prediction pixels are not filtered.

In the vertical mode, the prediction pixels are generated by copying the corresponding above reference pixel. The luma prediction pixels adjacent to the left reference pixel are filtered by the left neighboring reference pixel and the corner reference pixel. The chroma prediction pixels are not filtered.

In the horizontal mode, the prediction pixels are generated by copying the corresponding left reference pixel. The luma prediction pixels adjacent to the above reference pixel are filtered by the left neighboring reference pixel and the corner reference pixel. The chroma prediction pixels are not filtered.

Figure 5:
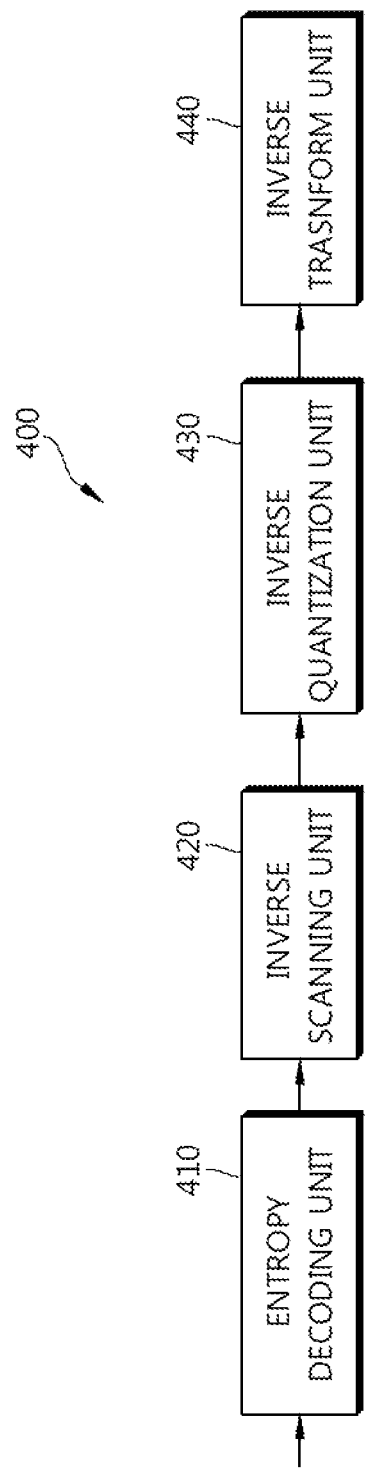
FIG. 5 is a block diagram of an apparatus of generating a residual block according to an embodiment of the present invention.

FIG. 5 is a block diagram of an apparatus 400 of generating a residual block according to the present invention.

The apparatus 400 according to the present invention includes an entropy decoding unit 410, an inverse scanning unit 420, an inverse quantization unit 430 and an inverse transform unit 440.

The entropy decoding unit 410 decodes encoded residual signals to generate quantized coefficient components. When CABAC is used for entropy coding, the coefficients components includes significant flags, coefficient signs and coefficient levels. The significant flag indicates whether the corresponding quantized transform coefficient is zero or not. The coefficient sign indicates a sign of non-zero quantized transform coefficient, and the coefficients level indicates an absolute value of non-zero quantized transform coefficient.

The inverse scanning unit 420 determines an inverse scan pattern and generates a quantized block using the inverse scan pattern. The operation of the inverse scanning unit 420 is the same as that of the inverse scanning unit 220 of FIG. 2.

The inverse quantization unit 430 derives quantization parameter, selects an inverse quantization matrix and inversely quantizes the quantized block to generate a transformed block.

The luma quantization parameter is derived as following.

A minimum size of a quantization unit is determined. The minimum size of the quantization unit is determined per picture using a QU size indicator included in the PPS. The QU size indicator specifies the minimum size of the quantization unit.

A differential quantization parameter (dQP) of the current coding unit is generated. The dQP is generated per quantization unit by entropy decoding. If the current coding unit does not contain an encoded dQP, the dQP is set to zero. If the quantization unit includes plural coding units, the dQP is included in the bit stream of the first coding unit containing non-zero coefficient.

A quantization parameter predictor of the current coding unit is generated. The quantization parameter predictor is generated using the same operation of the inverse quantization unit 230 of FIG. 2. If the quantization unit includes multiple coding units, the quantization parameter predictor of the first coding unit in the decoding order is generated, and the generated quantization parameter predictor is shared for all other coding units within the quantization unit.

The quantization parameter is generated using the dQP and the quantization parameter predictor.

The chroma quantization parameter is generated using the luma quantization parameter and an offset parameter indicating the relationship between the luma quantization parameter and the chroma quantization parameter. The offset parameter is included in the PPS. The offset parameter is changed by an offset adjusting parameter included in the slice header if it is allowed to change the offset by the slice.

The inverse transform unit 440 inversely transforms the transformed block to generate a residual block. An inverse transform type is adaptively determined according to the prediction mode and the size of the transform unit. The inverse transform type is the DCT-based integer transform or the DST-based integer transform. In intra prediction mode, if the size of the luma transform unit is smaller than 8×8, the DST-based integer transform is used, otherwise, the DCT-based integer transform is used. The DCT-based integer transform is applied to the chroma transformed block.

The prediction block and the residual block are added to generate a reconstructed block. The size of the reconstructed block is equal to the size of the transform unit. Therefore, if the size of the prediction unit is larger than the transform unit, the first reconstructed block is generated and then the next reconstructed block in the decoding order is generated by generating a prediction block and a residual block until the last reconstructed block is generated. The intra prediction mode of the current prediction unit is used for generating prediction blocks and residual blocks.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for generating a residual block, the method comprising
decoding residual signals to generate quantized coefficient components;
determining an inverse scan pattern and generating a quantized block using the inverse scan pattern;
deriving a quantization parameter and inversely quantizing the quantized block using the quantization parameter to generate a transformed block; and
inversely transforming the transformed block to generate a residual block,
wherein when the quantization parameter is a chroma quantization parameter, the chroma quantization parameter is generated using a luma quantization parameter and an offset parameter indicating a relationship between the luma quantization parameter and the chroma quantization parameter,
the luma quantization parameter is derived using a differential quantization parameter and a quantization parameter predictor, and the differential quantization parameter is generated by entropy decoding,
if two or more quantization parameters are available among a left quantization parameter, an above quantization parameter and a previous quantization parameter of a current coding unit, the quantization parameter predictor is generated using two available quantization parameters,
if only one quantization parameter is available among the left quantization parameter, the above quantization parameter and the previous quantization parameter, the available quantization parameter is set as the quantization parameter predictor, and
wherein when the transformed block is the luma block and the prediction mode is inter prediction, the inverse transform type used for inversely transforming the transformed block is a DCT-based integer transform.

2. The method of claim 1, wherein when the transformed block is a luma block and a prediction mode is an intra prediction, an inverse transform type used for inversely transforming the transformed block is a DST-based integer transform if the size of the transformed block is smaller than 8×8, and the inverse transform type used for inversely transforming the transformed block is a DCT-based integer transform if the size of the transformed block is not smaller than 8×8.

3. The method of claim 1, wherein when the transformed block is a chroma block, the inverse transform type used for inversely transforming the transformed block is a DCT-based integer transform.

4. The method of claim 1, wherein if the left and above quantization parameters are available, an average of the left and above quantization parameters is set as the quantization parameter predictor.

5. The method of claim 1, wherein when a prediction mode is an intra prediction, the residual signals are luma signals and a size of the quantized block is equal to or smaller than 8×8, the inverse scan pattern is selected among a diagonal scan, a vertical scan and a horizontal scan.

6. The method of claim 1, wherein when a prediction mode is an intra prediction, the residual signals are chroma signals and a size of the quantized block is equal to 4×4, the inverse scan pattern is selected among a diagonal scan, a vertical scan and a horizontal scan.

7. The method of claim 1, wherein when a size of the quantized block is larger than 4×4, plural subsets are generated by applying the inverse scan pattern to significant flags, coefficient signs and coefficient levels, and the quantized block is generated by applying the inverse scan pattern to the plural subset.

8. A method for encoding a residual block, the method comprising:
    generating a prediction block using an intra prediction mode or an motion information;
    generating a residual block by subtracting the prediction block from an original block;
    transforming the residual block to generate a transformed block;
    quantizing the transformed block using a quantization parameter to generate a quantized block;
    determining a scan pattern and applying the scan pattern to the quantized block to generate one-dimensional coefficient information; and
    entropy-coding the one-dimensional coefficient information,
    wherein the quantization parameter is the luma quantization parameter and a differential quantization parameter is generated by subtracting a quantization parameter predictor from the luma quantization parameter, and the differential quantization parameter is entropy encoded, and an offset parameter is generated and the offset parameter indicates a relationship between the luma quantization parameter and the chroma quantization parameter,
    if two or more quantization parameters are available among a left quantization parameter, an above quantization parameter and a previous quantization parameter of a current coding unit, the quantization parameter predictor is generated using two available quantization parameters,
    if only one quantization parameter is available among the left quantization parameter, the above quantization parameter and the previous quantization parameter, the available quantization parameter is set as the quantization parameter predictor, and
    wherein when the residual block is the luma block and the prediction mode is inter prediction, the transform type used for transforming the residual block is a DCT-based integer transform.

9. A bitstream including encoded image information generated by the method of claim 8.

10. A computer-readable storage medium storing encoded video information, comprising:
    a bit stream stored in the medium, the bit stream comprising entropy-encoded information on a differential quantization parameter and a quantized block,
    wherein the quantized block is inversely quantized with a quantization parameter to generate a transformed block and the transformed block is inversely transformed to generate a residual block, and a reconstructed block is generated with the residual block and a prediction block,
    wherein when the quantization parameter is a chroma quantization parameter, the chroma quantization parameter is generated using a luma quantization parameter and an offset parameter indicating a relationship between the luma quantization parameter and the chroma quantization parameter,
    the luma quantization parameter is derived using a differential quantization parameter and a quantization parameter predictor, and the differential quantization parameter is generated by entropy decoding,
    if two or more quantization parameters are available among a left quantization parameter, an above quantization parameter and a previous quantization parameter of a current coding unit, the quantization parameter predictor is generated using two available quantization parameters,
    if only one quantization parameter is available among the left quantization parameter, the above quantization parameter and the previous quantization parameter, the available quantization parameter is set as the quantization parameter predictor, and
    wherein when the transformed block is the luma block and the prediction mode is inter prediction, the inverse transform type used for inversely transforming the transformed block is a DCT-based integer transform.

* * * * *